Nov. 12, 1963     P. H. POETZSCH ETAL     3,110,537
COMPOSITE FLUID AND ELECTRICAL COUPLING
Filed Sept. 29, 1958     4 Sheets-Sheet 1

INVENTORS:
PAUL H. POETZSCH
and JOHN Z. LOWE, deceased
by HARMON L. SHAW, Administrator
BY Eaton, Bell, Hunt & Seltzer
ATTORNEYS Nov. 12, 1963  P. H. POETZSCH ETAL  3,110,537
COMPOSITE FLUID AND ELECTRICAL COUPLING
Filed Sept. 29, 1958  4 Sheets-Sheet 4

INVENTORS
PAUL H. POETZSCH
and JOHN Z. LOWE, deceased
by HARMON L. SHAW, Administrator
BY Eaton, Bell, Hunt & Seltzer
ATTORNEYS United States Patent Office  3,110,537
Patented Nov. 12, 1963

3,110,537
COMPOSITE FLUID AND ELECTRICAL
COUPLING
Paul H. Poetzsch, Charlotte, N.C., and John Z. Lowe, deceased, late of Charlotte, N.C., by Harmon L. Shaw, administrator, Charlotte, N.C., assignors to Perfecting Service Company, Charlotte, N.C., a corporation of North Carolina
Filed Sept. 29, 1958, Ser. No. 764,137
5 Claims. (Cl. 339—16)

This invention relates to an improved breakaway composite fluid and electrical coupling including a pair of separable joint parts, each of which comprises a tubular coupling member and an electrical connector mounted thereabout for cooperation with the other such joint part to complete a fluid coupling and an electrical circuit.

Composite fluid and electrical couplings of the quick-disconnecting type are finding increasing uses in many fields, one of which is the field of aeronautics. High altitude flying necessitates the use of oxygen breathing equipment for aircraft pilots in addition to the usual electrically operated appliances, such as earphones, microphones, radio or other electrical instruments, so much a part of modern-day flying techniques.

The use of conventional composite fluid and electrical couplings is not without some attendant risk, however, because there is no provision for breaking the electrical connection prior to the breaking of the fluid coupling in conventional composite couplings. The electrical connection is either broken simultaneously with the fluid coupling or subsequently thereto. At the time that the electrical connection is broken, a spark may be caused, which combined with the escape of oxygen engendered by the previous or simultaneous breaking of the fluid coupling, creates a strong possibility of an explosion and/or a fire.

Therefore, since the breaking of the electrical connection in the composite coupling may cause an arcing of electric current between the contacts of the electrical connectors, it is important to insure that the leakage of oxygen from the fluid coupling cannot occur.

It is a principal object of this invention to provide an improved composite breakaway fluid and electrical coupling, wherein the breaking of the electrical connection is accomplished prior to the breaking of the fluid coupling. Thus, any sparks created when the electrical connection is broken are dissipated before the fluid coupling is broken, whereby the possibility of an explosion and/or a fire is precluded.

It is another object of this invention to provide an improved composite breakaway fluid and electrical coupling, wherein a pair of plug and socket members are releasably held in telescoped relationship by detent means therebetween to form a fluid coupling and the adjacent end portions of the plug and socket members have separable electrical connector units thereon for completing an electrical circuit when the plug and socket members are held in fully telescoped relationship by the detent means. The detent means is controlled by a detent actuator means which normally confines the detent means in "lock" position to retain the plug and socket members in fully telescoped relationship, but which is manually movable to release the detent means while carrying one of the electrical connector units therewith to disconnect it from the other such unit. Thus, the electrical connection is broken when the detent means is released to permit subsequent movement of the plug and socket members apart for breaking the fluid coupling formed by these members.

It is another object of this invention to provide in an improved breakaway composite fluid and electrical coupling, detent means to releasably lock a pair of fluid coupling members in coupled relationship and a pair of separable electrical connector units mounted on adjacent end portions of the fluid coupling members. The detent means is controlled by a movable detent actuator means which normally confines the detent means in "lock" position, but which automatically releases the detent means upon movement of the fluid coupling members apart. The movement of the fluid coupling members apart is effective to separate the electrical connector units carried thereby for breaking the electrical connection therebetween prior to the time that the fluid coupling formed by the fluid coupling members is broken by continued movement of these members apart from each other.

Some of the objects of the invention having been stated, other objects will appear as the description proceeds when taken in connection with the accompanying drawings, in which—

Referring more specifically to the drawings, the first form of the composite fluid and electrical coupling embodying the present invention is illustrated in FIGURES 1–9, inclusive. The first form of the composite coupling is broadly designated by the reference numeral 10 and comprises a pair of tubular coupling members 11 and 12 respectively. A pair of separable electrical connector units 13 and 14 are mounted about adjacent end portions of the tubular coupling members 11 and 12, respectively, for mating engagement with each other to complete an electrical circuit, as hereinafter more fully described. The tubular coupling member 11 and its associated electrical connector unit 13 define one component joint part A of the composite coupling 10, while tubular coupling member 12 and electrical connector unit 14 define the other component joint part B.

The tubular coupling member 11 may be termed a socket member for telescopic reception therewithin of the tubular coupling member or plug member 12. The socket member 11 comprises a core 15 and a shell 16 threadably secured about the leading end portion thereof. The shell 16 is of stepped configuration, having three cylindrical portions 17, 18 and 19 of progressively decreasing diameter. A plurality of pockets 22 are formed in the cylindrical portion 19 of shell 16 having the smallest diameter for reception of a corresponding number of detent balls 23, it being noted that each pocket 22 converges inwardly to retain its respective detent ball 23.

The intermediate cylindrical portion 18 of shell 16 includes stepped cylindrical bores 24 and 25, bore 25 being of smaller diameter than bore 24. An annular washer 26 is seated against the shoulder formed by the juncture between bores 24 and 25, being held firmly thereagainst by the end of core 15 which is received within shell 16. The cylindrical portion 19 of shell 16 includes a cylindrical bore 27 of smaller diameter than bore 25, thereby providing a shoulder at the juncture between bores 25 and 27. Thus, an internal groove is defined in shell 16 by the annular washer 26, bore 25, and the shoulder forming the juncture between bores 25 and 27 for the reception of a resilient sealing means 30 which may be a rubber O-ring.

Figures 1, 2:
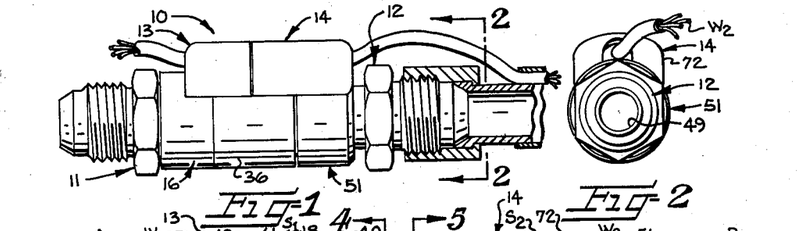
FIGURE 1 is an elevational view, partially in section, illustrating one form of the composite fluid and electrical coupling embodying the present invention.
FIGURE 2 is an end elevational view taken along line 2—2 in FIGURE 1, with the hose in FIGURE 1 removed.
Figures 3, 4, 5, 6, 7:
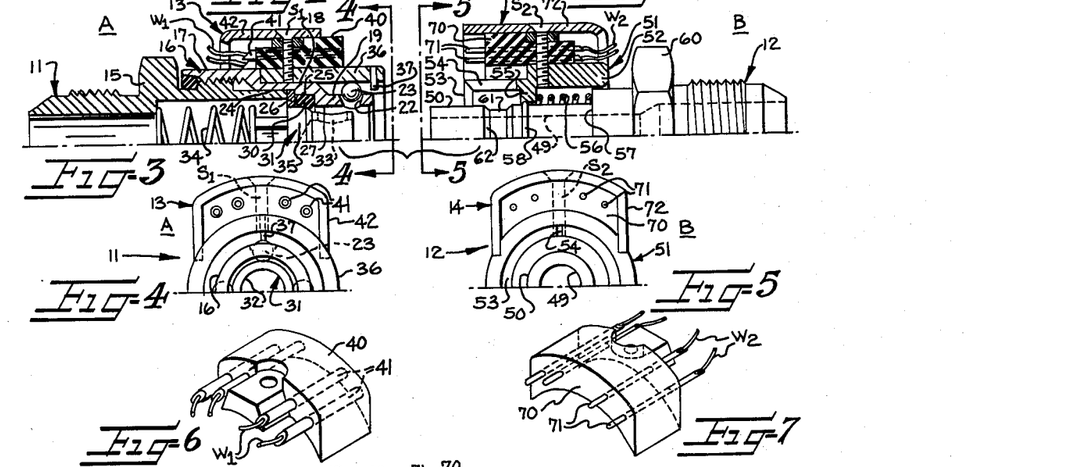
FIGURE 3 is an enlarged fragmentary longitudinal sectional view of the composite coupling shown in FIGURE 1 as it appears in uncoupled relationship.
FIGURE 4 is an end elevational view taken along line 4—4 in FIGURE 3.
FIGURE 5 is an end elevational view taken along line 5—5 in FIGURE 3.
FIGURE 6 is a perspective view of the female electrical connector unit shown in FIGURE 3.
FIGURE 7 is a perspective view of the male electrical connector unit shown in FIGURE 3.

The socket member 11 is provided with an internal valve member 31 which includes an outer portion having a central axial port 32 open only in the direction of the leading end of socket member 11 and a plurality of radial ports 33 providing communication between the axial port 32 and the interior of core 15. The valve member 31 cooperates with the resilient O-ring 30 which serves as a valve seat, the valve member 31 being axially biased by a spring 34 interposed between the valve member 31 and an internal shoulder within core 15 toward the leading end of socket member 11. In this connection, the valve member 31 has an uninterrupted annular plug portion 35 adjacent its outer portion which engages the resilient O-ring 30 when the socket member 11 is disassembled from plug member 12, as shown in FIGURE 3, to seal the interior of core 15 against leakage of oxygen or other fluid therefrom. When the valve member 31 occupies the position shown in FIGURE 3, it will be observed that the outer portion thereof which includes the axial port 32 and radial ports 33 is permitted to pass beyond the O-ring 30 providing the valve seat for plug portion 35.

A cylindrical sleeve 36 is rigidly mounted on the intermediate cylindrical portion 18 of shell 16, one end abutting the shoulder forming the juncture between cylindrical portions 17 and 18 and the other leading end extending beyond the end of cylindrical portion 19. The diameter of sleeve 36 corresponds with the diameter of cylindrical portion 17. A radially inwardly extending pin 37 is carried by the sleeve 36 adjacent its leading end for a purpose to be subsequently described.

The cylindrical sleeve 36 serves as a means to mount the electrical connector unit 13 on the socket member 11 as will be presently described. The electrical connector unit 13 may be termed a female or socket member and comprises an insulating block 40 having a plurality of fixed conducting tubes 41 extending therethrough. The conducting tubes 41 are open at the leading end of block 40 and receive wires $W_1$ for electrical circuits at their opposite ends. A metallic casing 42 houses the insulating block 40. Suitable means, such as a screw $S_1$, is employed to fixedly secure the casing 42 and block 40 to the cylindrical sleeve 36.

Referring now to the tubular coupling member or plug member 12, it will be observed that the plug member 12 has a central bore 49 and is provided with a cylindrical leading end portion 50 for telescopic reception within socket member 11 and carries an axially movable actuator means 51 adapted to cooperate with the detent balls 23 carried by socket member 11 in a manner to be presently described. The movable actuator means 51 comprises an annular cylindrical sleeve 52 having an axial extension 53 of reduced diameter whose leading end is received in the space defined between the sleeve 36 and the cylindrical portion 19 of shell 16 in socket member 11. The axial extension 53 is provided with an elongated slot 54 for reception of the pin 37 carried by sleeve 36 of socket member 11 for a purpose to be subsequently described. At the juncture between sleeve 52 and its axial extension 53, a radially inwardly extending flange 55 is formed to provide a seat for a spring 56 interposed between it and a shoulder 57 formed on plug member 12.

It will be apparent that spring 56 biases the actuator means 51 forwardly in a direction toward socket member 11. A retainer ring 58 is seated in a groove formed in a medial portion of the cylindrical leading end portion 50 of plug member 12. The retainer ring 58 is adapted to abut the forward end of flange 55 (as shown in FIGURE 3), thereby limiting the forward movement of the actuator means 51 under the influence of spring 56. An enlarged collar 60 is formed on the plug member 12 and is adapted to abut the rear end of the movable sleeve 52 for limiting the rearward movement of the actuator means 51. Outwardly of the retainer ring 58, an annular groove 61 with radially outwardly diverging side walls is formed in the cylindrical leading end portion 50 of plug member 12. The annular groove 61 is adapted to receive the detent balls 23 upon movement of the plug and socket members 12 and 11 into fully telescoped position, and the outermost side wall 62 thereof is adapted to serve as a cam means to displace the detent balls 23 from the groove 61 upon movement of the plug and socket members 12 and 11 apart.

The electrical connector unit 14 may be termed a male or plug member and is rigidly mounted on the movable actuator means 51 carried by plug member 12, as will be presently described. The electrical connector unit 14 comprises an insulating block 70 having a plurality of prongs or contact pins 71 embedded therein. The forward ends of the contact pins 71 protrude from the leading end of block 70 for insertion within corresponding conducting tubes 41 of the female connector unit 13 mounted on socket member 11. The contact pins 71 are attached to wires $W_2$ for electrical circuits at their opposite ends. Thus, it will be understood that a plurality of electrical circuits will be completed upon the contact pins 71 being matingly received by the conducting tubes 41. A metallic casing 72 houses the insulating block 70 and a screw S₂ fixedly secures casing 72 and block 70 to the cylindrical sleeve 52.

FIGURE 3 shows the composite coupling 10 as it appears when broken apart into its component joint parts A and B, respectively. The slot 54 in the axial extension element 53 of joint part B is positioned to receive the pin 37 carried by the sleeve 36 of joint part A, thereby alining the respective elements of parts A and B for mating engagement when the parts are moved toward each other to form the composite coupling 10.

Figures 8, 9:
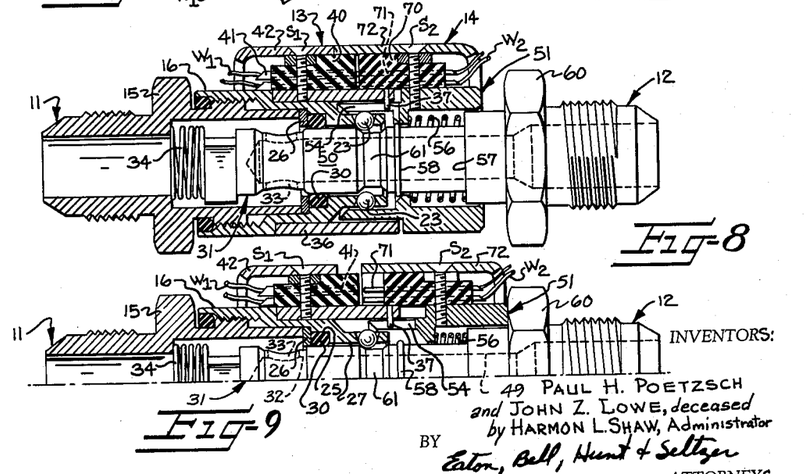
FIGURE 8 is a longitudinal sectional view of the composite coupling similar to that illustrated in FIGURE 3, but showing the composite coupling as it appears in fully coupled relationship.
FIGURE 9 is a fragmentary longitudinal sectional view similar to FIGURES 3 and 8, but illustrating the composite coupling when the electrical circuit has been broken by moving the electrical connectors apart while the fluid coupling remains intact.
Figure 10:
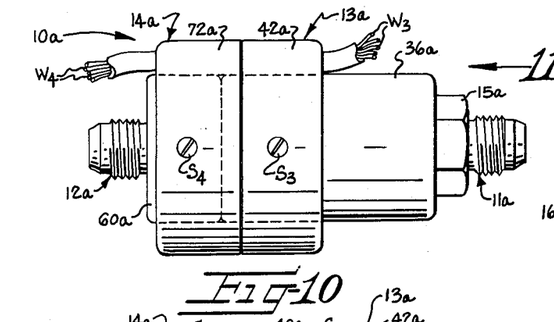
FIGURE 10 is an elevational view of a modified form of the composite fluid and electrical coupling.
Figure 11:
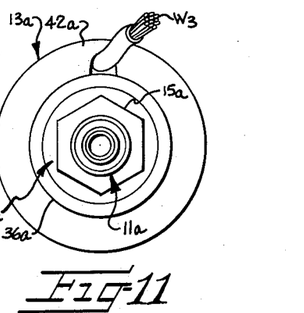
FIGURE 11 is an end elevational view looking in the direction of arrow 11 in FIGURE 10.

It will be apparent that the movement of parts A and B toward each other causes the contact pins 71 to be received by the conducting tubes 41, while the tubular plug member 12 is telescoped within the tubular socket member 11, thereby forming the composite fluid and electrical coupling, as shown in FIGURE 8.

The leading end portion 50 of the plug member 12 abuts valve member 31 upon being inserted within socket member 11, and forces the valve member 31 rearwardly to unseat its plug portion 35 from sealing engagement with O-ring 30, thereby establishing fluid communication between the core 15 of socket 11 and the tubular plug 12 through the radial ports 33 and the axial port 32 in the valve member 31, it being noted that the axial port 32 is coextensive with the central bore 49 through plug member 12. After the valve member 31 has been unseated from sealing engagement with O-ring 30, it will be observed that the leading end portion 50 of plug member 12 assumes sealing engagement therewith.

During the movement of joint parts A and B into the fully coupled position illustrated in FIGURE 8, the leading end of the axial extension 53 of the movable actuator means 51 engages the detent balls 23. The further forward movement of joint part B compresses the spring 56 because of the abutment between the detent balls 23 and the leading end of the axial extension 53, it being understood that the balls 23 cannot escape from their respective pockets 22. When the plug member 12 of joint part B has been telescoped within the socket member 11 of joint part A to a point where the annular groove 61 formed in the leading end portion 50 of the plug member 12 registers with the detent balls 23, the detent balls 23 will be projected into the groove 61 with a snap action by the leading end of the axial extension 53 through the force transmitted by the spring 56 as it expands, thereby releasably locking the plug and socket members 12 and 11 in fully telescoped position to define the fluid coupling. It will be observed that the axial extension 53 of the movable actuator means 51 overlies each of the detent balls 23, thus confining them against displacement from the groove 61 for releasably retaining the plug and socket members 12 and 11 in fully telescoped relation.

FIGURE 9 shows the relative positions of the joint parts A and B as they are being separated. To accomplish separation, the actuator means 51 or the electrical connector unit 14 carried thereby is grasped and moved rearwardly until the rear end of sleeve 52 abuts the enlarged collar 60 on plug member 12. It will be observed that the rearward movement of the actuator means 51 and the electrical connector unit 14 achieves two distinct results—first, the contact pins 71 of the electrical connector unit 14 are withdrawn from the conducting tubes 41 of the electrical connector unit 13 to break the electrical circuits, and second, the axial extension 53 is withdrawn from overlying confining relationship with respect to the detent balls 23 to free them for subsequent displacement from the groove 61. Thus, it will be seen that the electrical connection between the electrical connector units 13 and 14 must be broken before the fluid coupling formed between socket member 11 and plug member 12 can be broken. In breaking the fluid coupling, a continued rearward force applied to the actuator means 51 and the electrical connector unit 14 is transmitted to plug member 12 because of the abutment between sleeve 52 and the enlarged collar 60. This rearward force together with the outermost inclined side wall 62 of groove 61 effectively displaces the detent balls 23 from the groove 61, the outermost inclined side wall 62 of groove 61 acting as a cam means in displacing the detent balls 23. The spring 34 which has been placed under compression by the telescoping movement of plug member 12 within socket member 11 preferably does not possess sufficient strength to displace the detent balls 23 from groove 61 although it does apply a rearward force to the plug member 12 through valve member 31. This insures that the fluid coupling will not necessarily be broken merely because the axial extension 53 has been withdrawn from overlying confining relationship with respect to the detent balls 23. Once the detent balls 23 have been displaced from groove 61 in the manner described, the plug member 12 can be readily withdrawn from socket member 11 to break the fluid coupling.

It will be understood that the fluid coupling formed between the plug and socket members 12 and 11 will not be subject to leakage because of the sealed relationship therebetween furnished by O-ring 30. Even though an arcing of electric current may be caused by the breaking of the electrical connection between electrical connector units 13 and 14 in the manner described, such sparks as may be created will be dissipated before the fluid coupling is broken, thus preventing the formation of dangerous conditions which could result in an explosion and/or fire.

Three additional forms of composite couplings have been illustrated in the drawings, each of which operates in a similar manner to the composite coupling illustrated in FIGURES 1–9, inclusive. In certain instances, the reference numerals discussed in connection with FIGURES 1–9, inclusive, have also been used to designate corresponding elements in the other figures of the drawings with appropriate suffixes a, b and c added thereto. Thus, the component joint parts of the composite coupling 10a illustrated in FIGURES 10–13, inclusive, have been designated by reference characters Aa and Ba, for example.

Referring particularly to the modified composite coupling 10a illustrated in FIGURES 10–13, inclusive, of the drawings, it will be observed that the tubular socket member 11a comprises a core 15a, a shell 16a threadably secured about the leading end portion of the core 15a, and a cylindrical sleeve 36a threadably secured about the shell 16a. The shell 16a is provided with stepped cylindrical bores 80, 81 and 82 of progressively increasing diameter from the core 15a to the forward end of the shell 16a. A suitable recess is formed in core 16a adjacent bore 80 to provide a shoulder for seating a resilient annular seal 83 which may be a rubber sealing ring. The rubber sealing ring 83 is held firmly against the shoulder adjacent bore 80 by the end of core 15a which is threadably received within shell 16a. An axially elongated slot 54a is formed in the bore 82 of shell 16a and serves a purpose similar to slot 54 described in connection with the composite coupling 10 of FIGURES 1–9, inclusive.

It will be observed that the shell 16a presents a cylindrical portion 84 of reduced diameter which forms the leading end thereof. An annular space is thereby defined between the reduced cylindrical portion 84 of shell 16a and the surrounding cylindrical sleeve 36a. The reduced cylindrical portion 84 is provided with a plurality of pockets 22a having inwardly converging side walls for the reception of detent balls 23a. A radially inwardly directed annular flange 85 is formed on the forward end of the cylindrical sleeve 36a and extends into abutment with the recessed end of reduced cylindrical portion 84 to enclose the annular space formed between the reduced cylindrical portion 84 of shell 16a and the surrounding cylindrical sleeve 36a.

Actuator means for the detent balls 23a is provided in the form of a pair of annular rings 86 having inclined internal surfaces 87, the rings 86 being resiliently urged against opposite sides of the detent balls 23a by springs 88 and 89, respectively. It will be noted that the inclined internal surfaces 87 of the detent actuator rings 86 are convergent in a radially outward direction. A shoulder 90 formed on shell 16a seats the opposite end of spring 88 while the radially inwardly directed flange 85 of the cylindrical sleeve 36a provides a seat for the opposite end of spring 89.

The interior of core 15a is provided with an internal valve member 31a which includes an outer nib portion 91 having longitudinally extending slots 92 opening in the direction of the plug member 12a, the valve member 31a being axially biased toward the leading end of the socket member 12a by a spring 34a seated against an internal shoulder within core 15a. An annular collar member 35a is formed on the valve member 31a adjacent to the nib portion 91 for engagement with the resilient sealing ring 83 when the plug member 12a has not been telescoped within the socket member 11a beyond the position shown in FIGURE 12. When the valve member 31a occupies the position shown in FIGURE 12, it will be observed that the collar portion 35a thereof engages the sealing ring 83 in sealing relationship to seal the interior of core 15a against leakage of oxygen or other fluid therefrom. In this position, the longitudinal slots 92 provided in the outer nib portion 91 of the valve member 31a are ineffective to provide communication between the interior of the core 15a and the central bore 49a of the plug member 12a.

The female electrical connector unit 13a is mounted on the socket member 11a by suitable means, such as a screw $S_3$ which threadably secures the casing 42a and the insulating block 40a of the electrical connector unit 13a to the cylindrical sleeve 36a.

Referring now to the tubular coupling member or plug member 12a, it will be observed that the plug member 12a is provided with a cylindrical leading end portion 50a of reduced diameter, and a cylindrical intermediate portion 93 for telescopic reception within the socket member 11a. The diameter of the reduced cylindrical leading end portion 50a is only slightly less than the diameter of the intermediate bore 81 formed in shell 16a. A resilient O-ring 95 carried within a suitable groove on the cylindrical leading end portion 50a provides a seal between the plug and socket members 12a and 11a when the reduced cylindrical leading end portion 50a of plug member 12a has been introduced within the bore 81 sufficiently to permit the O-ring 95 to engage the surface defining bore 81. An alining pin 37a protrudes radially outwardly from the cylindrical intermediate portion 93 of plug member 12a for reception within the elongated slot 54a formed in shell 16a to aline the respective elements of the joint parts Aa and Ba for mating engagement.

The male electrical connection unit 14a is mounted on an enlarged collar 60a of plug member 12a by suitable means, such as a screw $S_4$. The cylindrical intermediate portion 93 of plug member 12a is provided with an annular groove 61a having radially outwardly diverging side walls, the groove 61a being adapted to receive the detent balls 23a upon movement of the plug and socket members 12a and 11a into fully telescoped position.

Figures 12, 13:
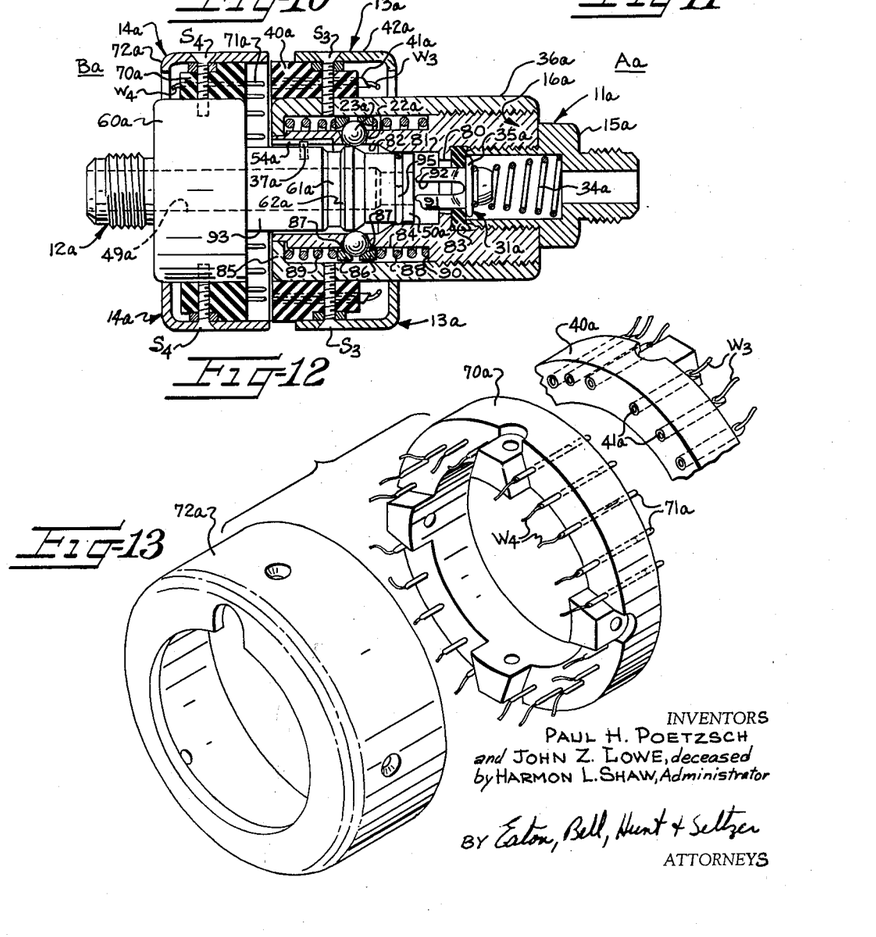
FIGURE 12 is an enlarged longitudinal sectional view of the modified composite coupling illustrated in FIGURE 10, showing the electrical connectors in spaced apart relationship while the fluid coupling remains intact.
FIGURE 13 is an enlarged exploded view of the electrical connector units in the composite coupling illustrated in FIGURE 12.
Figure 14:
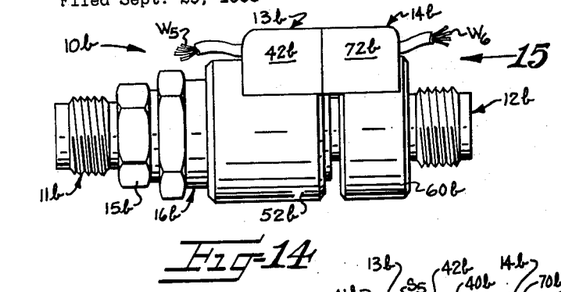
FIGURE 14 is an elevational view of a third form of composite fluid and electrical coupling.
Figure 15:
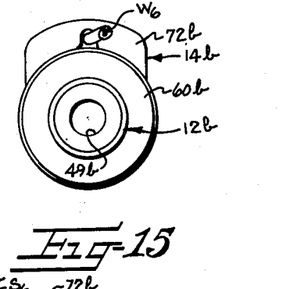
FIGURE 15 is an end elevational view looking in the direction of arrow 15 in FIGURE 14.

FIGURE 12 shows the composite coupling 10a as it appears when the electrical connection between the electrical connector units 13a and 14a is broken, while the fluid coupling formed between the plug and socket members 12a and 11a remains intact, but just prior to being broken. It will be noted that fluid communication between the socket member 11a and plug member 12a is blocked by the internal valve member 31a whose annular collar 35a engages the sealing ring 83.

It will be apparent that the movement of parts Aa and Ba toward each other causes the contact pins 71a to be received by the conducting tubes 41a for completing electrical circuits through wires $W_3$ and $W_4$ to which the conducting tubes 41a and contact pins 71a are attached, respectively. The reduced cylindrical leading end portion 50a of the plug member 12a abuts the nib portion 91 of valve member 31a upon being inserted within the socket member 11a. Further inward telescoping movement of the plug member 12a forces the valve member 31a rearwardly to unseat its annular collar 35a from sealing engagement with the sealing ring 83, thereby establishing fluid communication between the core 15a of socket member 11a and the tubular plug member 12a through the longitudinal slots 92 formed in the nib portion 91 of valve member 31a, it being apparent that the slots 92 have been advanced beyond the resilient sealing ring 83 within the interior of core 15a.

When the plug member 12a of joint part Ba has been telescoped within the socket member 11a of joint part Aa to a point where the annular groove 61a formed in the cylindrical intermediate portion 93 of the plug member 12a registers with the detent balls 23a, the detent balls 23a will be projected into the groove 61a with a snap action by the inclined internal surfaces 87 of the detent actuator rings 86 through the forces transmitted by the springs 88 and 89 respectively, thereby releasably locking the plug and socket members 12a and 11a in fully telescoped position to define the fluid coupling.

To separate the composite coupling 10a into its component joint parts Aa and Ba, the joint parts are pulled apart which causes the outermost inclined side wall 62a of annular groove 61a to cam the detent balls 23a outwardly of the groove. This outward movement of the detent balls 23a cams the detent actuator rings 86 axially apart against the biasing forces of the springs 88 and 89. When the detent balls 23a have been displaced in the manner described, the plug and socket members 12a and 11a are released from locking engagement, whereby continued withdrawal of the plug member 12a from the socket member 11a may be effected. As the separating movement of the joint parts Aa and Ba proceeds, it will be apparent that the contact pins 71a will be withdrawn from the conducting tubes 41a to break the electrical connection between the electrical connector units 13a and 14a, this position of the composite coupling 10a being illustrated in FIGURE 12. The separating movement of the joint parts Aa and Ba also permits the valve member 31a to move to closed position under the biasing force of spring 34a, wherein its collar 35a engages the sealing ring 83 to block fluid communication between the socket member 11a and the plug member 12a of the fluid coupling. Moreover, it will be apparent that the O-ring seal 95 interposed between the socket member 12a and plug member 11a seals against the leakage of oxygen or other fluid from the fluid coupling until after such time as the electrical connection between the electrical connector units 13a and 14a is broken. The separation of the composite coupling 10a into its component joint parts Aa and Ba is completed by continuing to draw these parts apart, thereby separating the plug and socket members 12a and 11a defining the fluid coupling.

A third form of composite coupling 10b comprising joint parts Ab and Bb is illustrated in FIGURES 14–17, inclusive. The socket member 11b includes a core 15b having a shell 16b threadably secured about the leading end portion thereof. The shell 16b is provided with stepped cylindrical bores 100 and 101, bore 101 being of greater diameter than bore 100 and having an axially elongated slot 54b formed therein. A resilient annular seal 103 in the form of a rubber sealing ring is seated against an internal shoulder of shell 16b adjacent the bore 100, being held firmly thereagainst by the end of core 15b which is received within shell 16b. The internal valve member 31b and its associated parts which cooperate with the sealing ring 103 and the cylindrical leading end portion 50b of socket member 12b are the same as those elements described in connection with the composite coupling 10a illustrated in FIGURES 10–13, inclusive, hence further description thereof is deemed to be unnecessary.

The shell 16b incudes a reduced cylindrical portion 104 as its forward end, the reduced cylindrical portion 104 having a plurality of inwardly converging pockets 22b which receive detent balls 23b.

The socket member 11b carries an axially movable detent actuator means in the form of an annular cylindrical sleeve 52b encircling shell 16b. The detent actuator sleeve 52b is provided with a medially positioned annular internal groove 105 having inwardly diverging side walls. The detent actuating sleeve 52b is movable axially with respect to the shell 16b, being biased forwardly thereof by a spring 106 seated between an internal shoulder 107 formed on the detent actuating sleeve 52b and a shoulder 108 forming the juncture between the reduced cylindrical portion 104 and the remainder of shell 16b. A retainer ring 110 is received within a suitable groove formed in the reduced cylindrical portion 104 of shell 16b adjacent its leading end, the retainer ring 110 serving as a stop to limit the forward movement of the detent actuating sleeve 52b under the biasing influence of spring 106. A screw $S_5$ fixedly secures the electrical connector unit 13b to the detent actuating sleeve 52b for movement therewith.

The tubular coupling member or plug 12b of the composite coupling 10b is substantially identical to the plug member 12a illustrated in FIGURE 12 and previously described, it being noted, however, that the reduced cylindrical leading end portion 50b of plug member 12b does not require a sealing ring, such as the O-ring 95 shown in FIGURE 12, for sealing engagement with the bore 100 in shell 16b for reasons which will hereinafter be made apparent. As in the modification illustrated in FIGURE 12, the male electrical connector unit 14b is secured to an enlarged collar 60b formed on plug member 12b by a screw $S_6$.

Figures 16, 17:
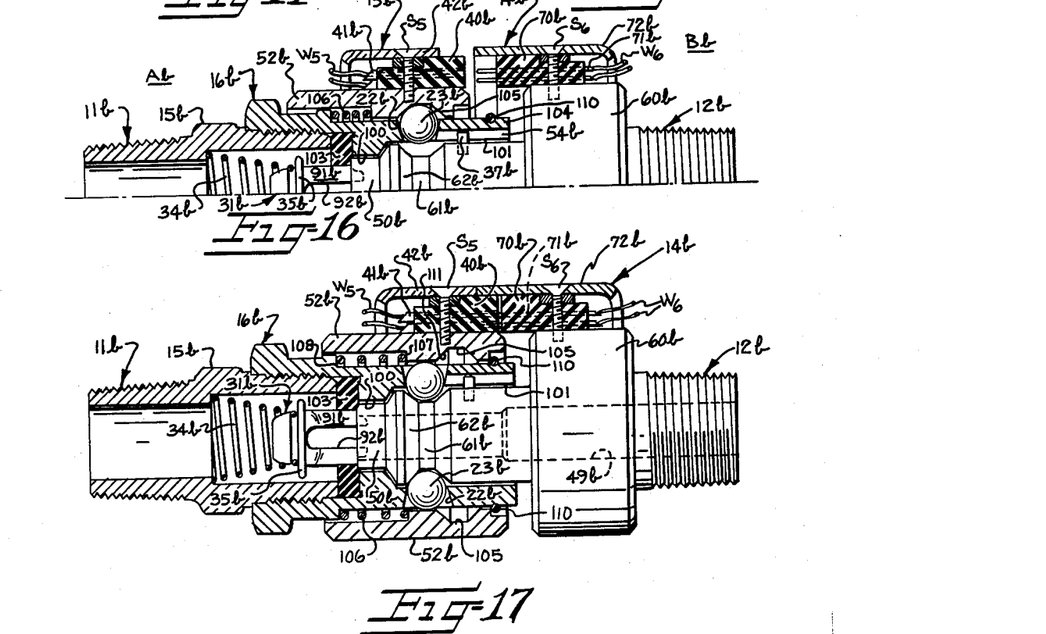
FIGURE 16 is an enlarged fragmentary longitudinal sectional view of the composite coupling illustrated in FIGURE 14, but showing the electrical connector units in spaced apart relationship while the fluid coupling remains intact.
FIGURE 17 is a longitudinal sectional view similar to FIGURE 16, but showing the composite coupling as it appears in fully coupled relationship.
Figure 18:
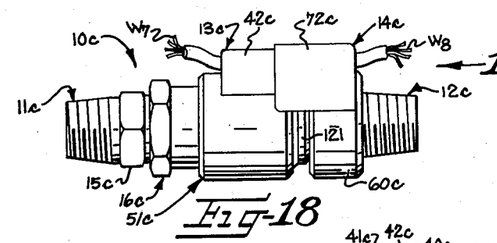
FIGURE 18 is an elevational view of a fourth form of composite fluid and electrical coupling.
Figure 19:
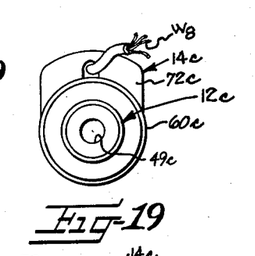
FIGURE 19 is an end elevational view looking in the direction of arrow 19 in FIGURE 18.

In assembling the composite coupling 10b illustrated in FIGURES 14–17, inclusive, the plug member 12b is telescoped within the socket member 11b until the leading end of its reduced cylindrical portion 50b contacts the resilient sealing ring 103, as shown in FIGURE 16. The detent actuating sleeve 52b is then grasped and moved axially toward the joint part Bb, thereby permitting the rear side wall 111 of its internal groove 105 to cam the detent balls 23b into the annular groove 61b, while establishing an electrical connection between the electrical connector unit 13b carried therewith and the electrical connector unit 14b mounted on the plug member 12b. Thus, the tubular plug and socket members 12b and 11b are releasably locked in fully telescoped relationship while the electrical circuits formed by wires $W_5$ and $W_6$ attached to the conducting tubes 41b and the contact pins 71b respectively are completed, this fully coupled relationship being illustrated in FIGURE 17.

To separate the joint parts Ab and Bb of the composite coupling 10b, the detent actuating sleeve 52b or the electrical connector unit 13b is grasped and moved rearwardly until the internal groove 105 in the detent actuating sleeve 52b registers with the detent balls 23b. The registration of the groove 105 with the detent balls 23b releases the detent balls 23b for subsequent displacement from groove 61b upon withdrawal of the plug member 12b. Moreover, the electrical connection between the electrical connector units 13b and 14b has been broken by the time that the internal groove 105 is in registration with the detent balls 23b. Upon pulling the plug member 12b apart from the socket member 11b, the outer inclined side wall 62b of groove 61b cams the detent balls 23b outwardly of the groove 61b for reception within the internal groove 105 formed in the detent actuating sleeve 52b to releasably lock the sleeve 52b and the electrical connector unit 13b carried thereby in the position shown in FIGURE 16. It can be appreciated that this arrangement locks the electrical connector unit 13b in spaced relationship with respect to the electrical connector unit 14b to insure that the electrical connection remains broken as the tubular plug member 12b is withdrawn from the socket member 11b.

FIGURES 18–22, inclusive, of the drawings illustrate a fourth form of the composite coupling designated as 10c and comprising joint parts Ac and Bc. The socket member 11c is similar in most respects to the socket member 11b of the composite coupling 10b previously described. It will be observed that the shell 16c of socket member 11c includes a reduced portion of stepped configuration as its forward end, comprising cylindrical portions 118, 119, and 120. The intermediate cylindrical portion 119 thereof has a plurality of inwardly converging pockets 22c for reception of detent balls 23c. A detent actuator means 51c carried by the socket member 11c and encircling the shell 16c comprises a cylindrical sleeve 52c and an abutment ring 121 slidably mounted within the cylindrical sleeve 52c adjacent its leading end and protruding forwardly thereof. The cylindrical sleeve 52c is provided with a pair of medially positioned internal shoulders 122, 123 which serve as seats for opposing springs 124, 125. The opposite end of spring 124 is seated against an external shoulder 126 formed on shell 16c. The opposite end of spring 125 is seated against a shoulder 130 provided on abutment ring 121 which includes a cylindrical sleeve portion 131 extending within spring 125 to maintain the spring in centered relationship. The detent actuating means 51c is limited in its forward movement with respect to the shell 16c by a retainer ring 132 disposed in a suitable groove provided in the intermediate cylindrical portion 119 of shell 16c which is adapted to abut the internal shoulder 123 of sleeve 52c. The internal portion of the cylindrical sleeve 52c bounded by the shoulders 122 and 123 defines a cylindrical confining bore 140 which is recessed at its trailing end to provide an inclined cam surface 141 for coaction with the detent balls 23c.

The electrical connector unit 13c is carried by the detent actuator means 51c, being secured thereto by screw $S_7$ which is threadably received by the cylindrical sleeve 52c. The plug member 12c is substantially the same as plug members 12a and 12b previously described and carries the electrical connector unit 14c therewith, the electrical connector unit 14c being secured to an enlarged collar 60c on the plug member 12c by means of a screw $S_8$. In this form of the composite coupling, a longitudinally extending alining slot 54c may be provided in the insulating block 40c to receive a longitudinally protruding pin 37c embedded in the insulating block 70c. When the longitudinally extending slot 54c is positioned to receive the pin 37c, the respective elements of joint parts Ac and Bc will be alined for mating engagement when these parts are moved toward each other to form the coupling 10c.

Figure 20:
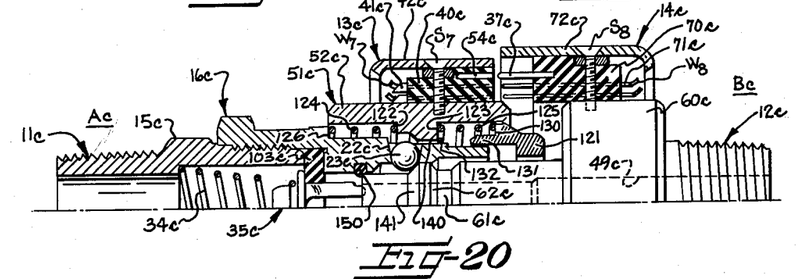
FIGURE 20 is an enlarged fragmentary longitudinal sectional view of the composite coupling shown in FIGURE 18, but showing the electrical connector units in spaced apart relationship while the fluid coupling remains intact.
Figure 21:
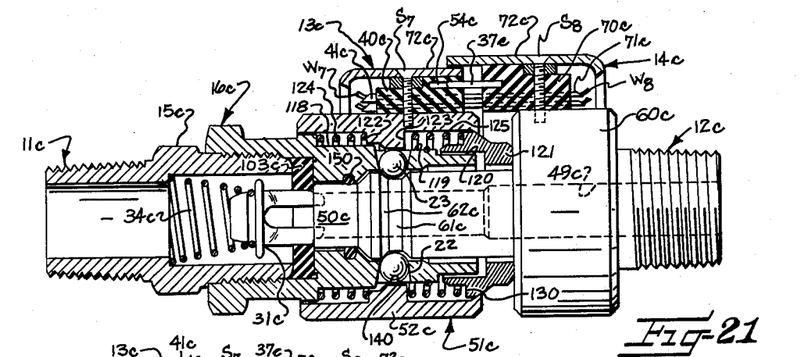
FIGURE 21 is a longitudinal sectional view similar to FIGURE 20, but showing the composite coupling as it appears in fully coupled relationship.

In this form of the invention, it will be observed that the casings 42c and 72c of the electrical connector units 13c and 14c, respectively, are disposed in overlapping relationship rather than the abutting engagement illustrated in the other forms of the composite coupling. The particular manner of separating the composite coupling 10c into its component joint parts Ac and Bc requires the aforesaid overlapping relationship between casings 42c and 72c, as hereinafter described. FIGURE 20 illustrates the component joint parts Ac and Bc of the composite coupling 10c as they are being moved toward each other to form the composite fluid and electrical coupling, as shown in FIGURE 21. As the plug member 12c is moved toward the socket member 11c, the enlarged collar 60c thereon engages the slidable abutment ring 121 of the detent actuator means 51c to apply a rearward force thereagainst tending to compress the spring 125. The spring 125 transmits this rearward force to the cylindrical sleeve 52c moving it rearwardly, whereby the inclined cam surface 141 strikes the detent balls 23c to project them downwardly into the annular groove 61c with a snap action. The bore 140 will then be disposed about the detent balls 23c to confine them in position within the annular groove 61c, thereby releasably locking the fluid coupling members 11c and 12c together.

The movement of the joint parts Ac and Bc toward each other also causes the contact pins 71c to be received by the conducting tubes 41c to complete a plurality of electrical circuits through wires $W_7$ and $W_8$ which are attached to the conducting tubes 41c and contact pins 71c, respectively. In contrast to the other embodiments of this invention, the electrical connector units 13c and 14c provide an electrical connection between the conducting tubes 41c and contact pins 71c, while allowing for further movement of these parts together as an initial step in accomplishing the separation of the component joint parts Ac and Bc of the composite coupling 10c.

Figure 22:
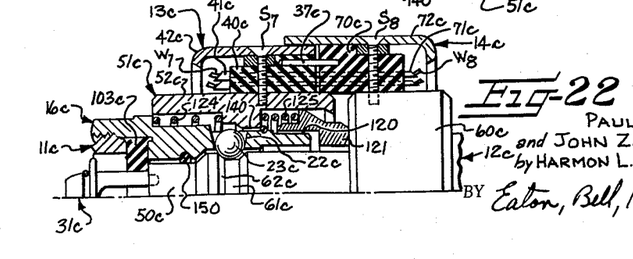
FIGURE 22 is a fragmentary longitudinal sectional view similar to FIGURES 20 and 21, but showing the electrical connector units and the fluid coupling members in the positions they would occupy just prior to the separation of the composite coupling into its component joint parts.

FIGURE 22 shows the relative positions of the joint parts Ac and Bc in the initial stage of separating these components. In this instance, to accomplish separation, the detent actuator means 51c or the electrical connector unit 13c carried thereby is grasped and moved forwardly toward the opposed electrical connector unit 14c until the internal shoulder 123 of the cylindrical sleeve 52c abuts the retainer ring 132 carried by the shell 16c. It will be observed that the forward movement of the detent actuator means 51c and the electrical connector unit 13c advances the confining surface defining bore 140 beyond the detent balls 23c to free them for subsequent displacement from the groove 61c. With the detent actuator means 51c and the electrical connector unit 13c held in the position shown in FIGURE 22, the tubular coupling members 11c and 12c may be pulled apart, the outermost inclined side wall 62c of groove 61c camming the detent balls 23c upwardly and displacing them from the groove 61c to release the coupling members 11c and 12c from locked engagement. As the plug and socket members 12c and 11c are being pulled apart, the electrical connector units 13c and 14c carried thereby are also moved apart to break the electrical connection therebetween, as shown in FIGURE 20, it being noted that an annular resilient O-ring seal 150 retained in an internal groove provided in the shell 16c engages the reduced cylindrical leading end portion 50c of the plug member 12c to maintain the fluid coupling intact until after the electrical connector units 13c and 14c have been moved apart sufficiently to break the electrical connection therebetween.

It will be appreciated that the composite couplings 10 and 10b require that the electrical connection formed between their respective electrical connector units must be broken before the fluid coupling members may be drawn apart to break the fluid coupling. On the other hand, the composite couplings 10a and 10c permit a limited withdrawal of the tubular coupling members apart from each other while the electrical connection between the electrical connector units remains unbroken, it being apparent that in the latter instance, means are provided to seal between the tubular coupling members during their withdrawal from each other to insure that the fluid coupling remains intact without leakage of fluid therefrom until after such time as the electrical connection between the electrical connector units has been broken by the movement of the coupling members apart.

It will also be observed that the electrical connector units illustrated in the composite couplings 10, 10a and 10b are constructed so as to have meshing relationship therebetween, one such unit having a protruding insulating block with respect to the surrounding casing to mesh with the opposed unit having a protruding casing with respect to the insulating block therein. In composite coupling 10c, it is necessary to move the electrical connector units 13c and 14c closer together as the first step in separating the joint parts Ac and Bc of the composite coupling.

Therefore, the opposed casings of the electrical connector units 13c and 14c are arranged for overlapping relationship rather than the butt joint formed between the casings in the composite couplings 10, 10a and 10b, it being noted that casing 72c extends beyond block 70c and surrounds casing 42c.

The electrical connector units may encircle only a portion of their respective coupling members as illustrated in the composite couplings 10, 10b and 10c, or may be annular in form where a greater number of electrical circuits are desired, as illustrated in composite coupling 10a. It is also apparent that the two forms of internal valves for the fluid coupling may be used interchangeably in the various composite couplings illustrated.

In the drawings, and specification there have been set forth preferred embodiments of the invention and, although specific terms are employed, they are used in a generic and descriptive sense only and not for purposes of limitation, the scope of the invention being defined in the claims.

We claim:

1. A composite breakaway coupling for a fluid conduit and an electrical circuit comprising first and second tubular coupling members, said first tubular coupling member being received within said second tubular coupling member in telescoped relationship to define a fluid conduit coupling, a detent carried by said second coupling member, said first coupling member being provided with a groove for reception of said detent to releasably lock said first and second coupling members in fully telescoped relationship, an axially movable detent actuator means on one of said first and second coupling members overlying and confining said detent in said groove to maintain the fluid conduit coupling between said first and second coupling members intact, a pair of separable male and female electrical connector units, said male electrical connector unit comprising an insulating block, at least one contact pin embedded in said insulating block, said pin having a forward end protruding from the leading end of said block, said female electrical connector unit comprising an insulating block, at least one conducting tube embedded in said insulating block of said female electrical connector unit and presenting an open end in alinement with said pin, one of said male and female electrical connector units being secured on the outer surface of said detent actuator means and being wholly disposed radially outwardly with respect thereto, the other of said male and female electrical connector units being secured on the outer surface of the other of said first and second coupling members and being wholly disposed radially outwardly with respect thereto, electrical conductors disposed radially outwardly of the fluid conduit coupling and attached to said pin and said tube of the male and female electrical connector units respectively, said male and female electrical connector units being thereby disposed about the periphery of the fluid conduit coupling in radially outwardly extending relationship with respect thereto and being in mating engagement with said pin being frictionally received in said tube to interconnect said electrical conductors for completing the electrical circuit when said first coupling member is fully telescoped within said second coupling member, said one electrical connector unit carried by said detent actuator means being separated from the other electrical connector unit for breaking the electrical circuit in response to axial movement of said detent actuator means in a direction releasing said detent from confinement within said groove, and said first and second coupling members being subsequently separable to break the fluid conduit coupling formed therebetween.

2. A composite breakaway coupling for a fluid conduit and an electrical circuit comprising first and second tubular coupling members, said first tubular coupling member being received within said second tubular coupling member in telescoped relationship to define a fluid conduit coupling, a detent carried by said second coupling member, said first coupling member being provided with a groove for reception of said detent to releasably lock said first and second coupling members in fully telescoped relationship, an axially movable detent actuator means comprising a cylindrical sleeve on one of said first and second coupling members overlying and confining said detent in said groove to maintain the fluid conduit coupling between said first and second coupling members intact, a pair of separable male and female electrical connector units, said male electrical connector unit comprising a casing, an insulating block received within said casing, at least one contact pin embedded in said insulating block, said pin having a forward end protruding from the leading end of said block, said female electrical connector unit comprising a casing, an insulating block received within the latter casing, at least one conducting tube embedded in said insulating block of said female electrical connector unit and presenting an open end in alinement with said pin, one of said male and female electrical connector units being secured on the outer surface of said detent actuator sleeve and being wholly disposed radially outwardly with respect thereto, the other of said male and female electrical connector units being secured on the outer surface of the other of said first and second coupling members and being wholly disposed radially outwardly with respect thereto, electrical conductors disposed radially outwardly of the fluid conduit coupling and attached to said pin and said tube of the male and female electrical connector units respectively, said male and female electrical connector units being thereby disposed about the periphery of the fluid conduit coupling in radially outwardly extending relationship with respect thereto, the casing of one of said male and female electrical connector units extending beyond the insulating block corresponding thereto toward the electrical connector unit opposed thereto, and the insulating block of the other electrical connector unit extending beyond the casing corresponding thereto toward the electrical connector unit opposed thereto, said male and female electrical connector units being in mating engagement with their respective casings and insulating blocks in meshing relationship and with said pin being frictionally received in said tube to interconnect said electrical conductors for completing the electrical circuit when said first coupling member is fully telescoped within said second coupling member, said one electrical connector unit carried by said detent actuator sleeve being separated from the other electrical connector unit for breaking the electrical circuit in response to axial movement of said detent actuator sleeve in a direction releasing said detent from confinement within said groove, and said first and second coupling members being subsequently separable to break the fluid conduit coupling formed therebetween.

3. A composite breakaway coupling as defined in claim 1, wherein said axially movable detent actuator means is mounted on said first coupling member and comprises a cylindrical sleeve having an axial extension, resilient means biasing said detent actuator means toward said second coupling member and maintaining the axial extension of said cylindrical sleeve in overlying confining relation to said detent carried by said second coupling member for releasably holding said detent in said groove, and movement of said cylindrical sleeve away from said second coupling member being effective to withdraw said axial extension from overlying confining relationship with respect to said detent thereby releasing said detent from confinement within the groove while separating said one electrical connector unit from the other unit.

4. A composite breakaway coupling as defined in claim 1, wherein said axially movable detent actuator means is mounted on said second coupling member and comprises a cylindrical sleeve having an internal confining surface and a groove adjacent thereto, resilient means biasing said cylindrical sleeve toward said first coupling member to position said internal confining surface thereon in overlying confining relation to said detent carried by said second coupling member for releasably locking said detent in the detent-receiving groove formed in said first coupling member, and movement of said cylindrical sleeve away from said first coupling member bringing the internal groove formed therein into registration with said detent to release it from confinement while separating said one electrical connector unit from the other unit.

5. A composite breakaway coupling as defined in claim 1, wherein said axially movable detent actuator means is mounted on said second coupling member and comprises a cylindrical sleeve having a medially positioned radially inwardly extending flange, said flange providing an internal confining surface on said sleeve, and resilient means seated against opposite sides of said flange to normally maintain said internal confining surface in overlying relationship with respect to said detent for releasably locking said detent in said groove.

References Cited in the file of this patent
UNITED STATES PATENTS

| | | |
|---|---|---|
| 2,224,057 | Mejean | Dec. 3, 1940 |
| 2,492,449 | Tuller et al. | Dec. 27, 1949 |
| 2,542,536 | Kirksey | Feb. 20, 1951 |
| 2,631,185 | Earle et al. | Mar. 10, 1953 |
| 2,735,993 | Humphrey | Feb. 21, 1956 |